United States Patent
Freeman et al.

(10) Patent No.: US 9,945,256 B2
(45) Date of Patent: Apr. 17, 2018

(54) SEGMENTED TURBINE SHROUD WITH SEALS

(71) Applicants: Rolls-Royce Coporation, Indianapolis, IN (US); Rolls-Royce North American Technologies, Inc., Indianapolis, IN (US)

(72) Inventors: Ted J. Freeman, Danville, IN (US); David J. Thomas, Brownsburg, IN (US); Joseph P. Lamusga, Indianapolis, IN (US); Aaron D. Sippel, Zionsville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 378 days.

(21) Appl. No.: 14/734,802

(22) Filed: Jun. 9, 2015

(65) Prior Publication Data
US 2015/0377035 A1    Dec. 31, 2015

Related U.S. Application Data

(60) Provisional application No. 62/018,124, filed on Jun. 27, 2014.

(51) Int. Cl.
| F01D 11/08 | (2006.01) |
| F01D 25/24 | (2006.01) |
| F01D 11/12 | (2006.01) |

(52) U.S. Cl.
CPC ............ *F01D 25/246* (2013.01); *F01D 11/12* (2013.01); *F05D 2240/11* (2013.01); *F05D 2250/184* (2013.01); *F05D 2300/6033* (2013.01); *Y02T 50/672* (2013.01)

(58) Field of Classification Search
CPC .... F01D 25/246; F01D 11/12; F01D 2240/11; F05D 2240/11; F05D 2250/184; F05D 2300/6033; Y02T 50/672
See application file for complete search history.

(56) References Cited

U.S. PATENT DOCUMENTS

| 5,404,793 | A | 4/1995 | Myers |
| 6,932,566 | B2 | 8/2005 | Suzumura et al. |
| 6,997,673 | B2 * | 2/2006 | Morris ................. F01D 11/005 415/173.1 |
| 8,439,629 | B2 | 5/2013 | Pietraszkiewicz et al. |
| 8,596,962 | B1 | 12/2013 | Liang |
| 8,647,055 | B2 | 2/2014 | Foster et al. |
| 8,834,105 | B2 * | 9/2014 | Albers ................. F01D 11/005 415/173.1 |
| 8,998,572 | B2 | 4/2015 | Lutjen et al. |

(Continued)

FOREIGN PATENT DOCUMENTS

EP      709550 A1   5/1996

*Primary Examiner* — Richard Edgar
(74) *Attorney, Agent, or Firm* — Barnes & Thornburg LLP

(57) ABSTRACT

A turbine shroud for a gas turbine engine includes a plurality of shroud segments arranged around a central axis. Each shroud segment includes a carrier segment, a blade track segment, and a radial seal element that seals a radial interface between the carrier segment and the blade track segment. The turbine shroud further includes a plurality of circumferential seals that seal circumferential interfaces between the shroud segments.

17 Claims, 5 Drawing Sheets

(56) References Cited

U.S. PATENT DOCUMENTS

| | | |
|---|---|---|
| 9,228,447 B2 | 1/2016 | McCaffrey |
| 9,587,504 B2 | 3/2017 | McCaffrey et al. |
| 2003/0053050 A1 | 3/2003 | Potyrailo et al. |
| 2003/0185674 A1* | 10/2003 | Alford .................... F01D 11/08 415/173.1 |
| 2004/0047725 A1 | 3/2004 | Tomita et al. |
| 2005/0232752 A1 | 10/2005 | Meisels |
| 2007/0025837 A1 | 2/2007 | Pezzetti et al. |
| 2009/0053050 A1 | 2/2009 | Bruce et al. |
| 2009/0092485 A1 | 4/2009 | Bridges, Jr. et al. |
| 2009/0096174 A1 | 4/2009 | Spangler et al. |
| 2011/0044801 A1 | 2/2011 | Di Paola et al. |
| 2011/0056055 A1 | 3/2011 | Gendraud et al. |
| 2011/0232752 A1 | 9/2011 | Mataki et al. |
| 2012/0301269 A1 | 11/2012 | Alvanos et al. |
| 2013/0136582 A1 | 5/2013 | Mizokami et al. |
| 2013/0266416 A1 | 10/2013 | Bergman et al. |
| 2014/0030072 A1 | 1/2014 | Hillier et al. |
| 2016/0312639 A1* | 10/2016 | Shapiro .................... F01D 11/08 |
| 2016/0362992 A1 | 12/2016 | Roy Thill et al. |

\* cited by examiner

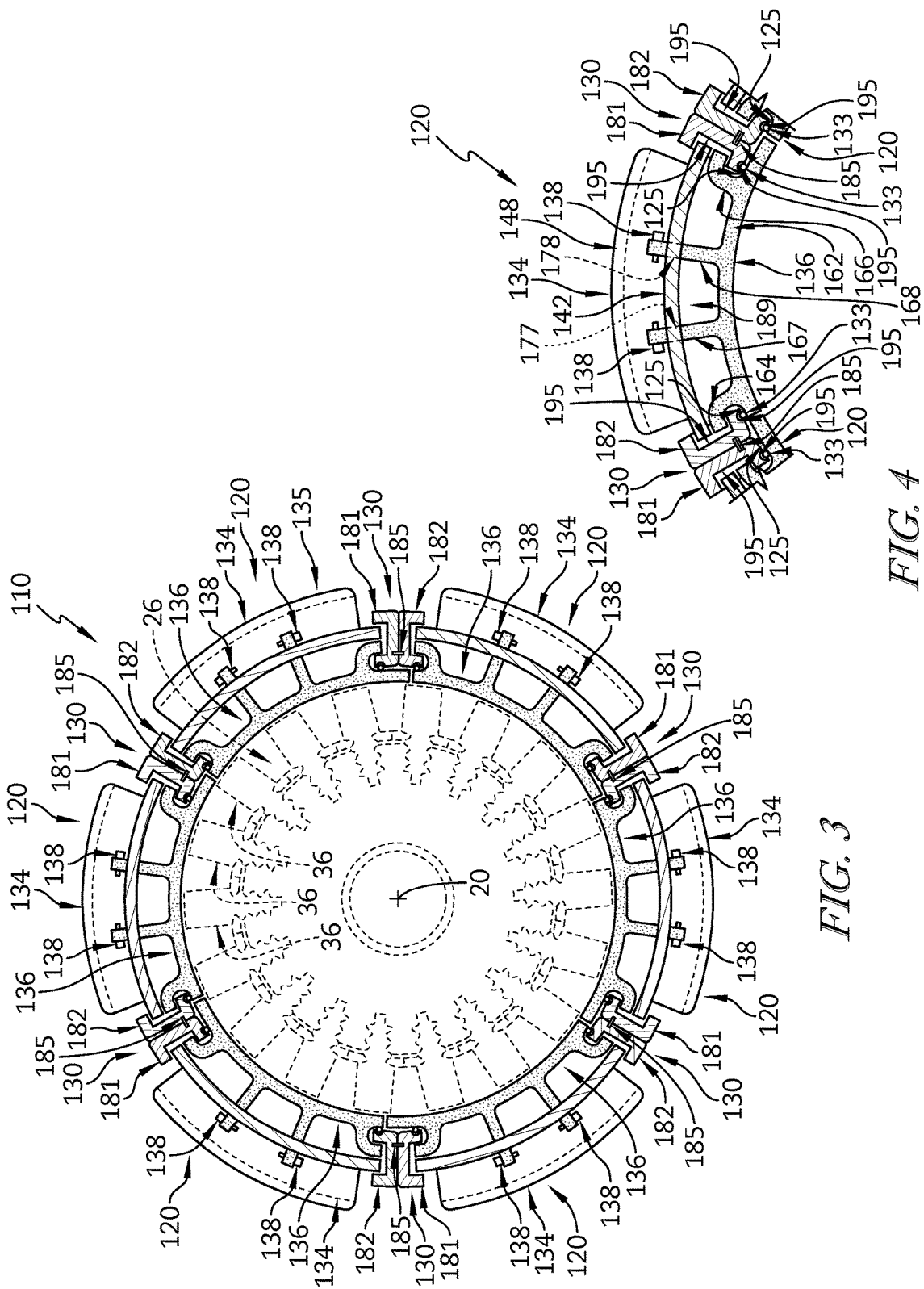

SEGMENTED TURBINE SHROUD WITH SEALS

CROSS REFERENCE TO RELATED APPLICATIONS

This application claims priority to and the benefit of U.S. Provisional Patent Application No. 62/018,124, filed Jun. 27, 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine. Some shrouds are made up of a number of segments arranged circumferentially adjacent to one another to form a ring. Such shrouds sometimes include sealing elements between parts to block air from leaking through the shroud during operation of the gas turbine engine. Thus, more air is forced to pass over the blades included in the rotating wheel assemblies which extract work from the air.

SUMMARY

The present application discloses one or more of the features recited in the appended claims and/or the following features which, alone or in any combination, may comprise patentable subject matter.

A segmented turbine shroud that extends around a central axis may include a first shroud segment and a second shroud segment arranged circumferentially adjacent to the first shroud segment. The first shroud segment may include a first carrier segment and a first blade track segment. The first blade track segment may be made from a ceramic-matrix-composite material and may be coupled to the first carrier segment. The second shroud segment may include a second carrier segment and a second blade track segment. The second blade track segment may be made from a ceramic-matrix-composite material and may be coupled to the first carrier segment.

In some embodiments, the segmented turbine shroud may also include a circumferential seal arranged between the first shroud segment and the second shroud segment to block gasses from passing through a circumferential interface of the first shroud segment and the second shroud segment. The circumferential seal may include a first seal support coupled to the first shroud segment, a second seal support coupled to the second shroud segment, and a seal element that extends from the first seal support to the second seal support.

In some embodiments, the seal element may be a strip seal that extends into a seal-receiving slot formed in the second seal support. The first seal support may form a channel that receives a portion of the first carrier segment and a portion of the first blade track segment. The second seal support may form a channel that receives a portion of the second carrier segment and a portion of the second blade track segment.

In some embodiments, the first blade track segment may include an arcuate runner and a support hanger that extends from the arcuate runner into the channel formed by the first seal support. The support hanger may include a radially-extending portion that extends from the arcuate runner and a circumferentially-extending portion that extends from the radially-extending portion into the channel formed by the first seal support.

In some embodiments, the first blade track segment may include an arcuate runner, a first attachment post that extends from the arcuate runner to the first carrier segment, and a second attachment post. The second attachment post may be circumferentially spaced apart from the first attachment post and may extend parallel to the first attachment post from the arcuate runner to the first carrier segment.

In some embodiments, the first carrier segment may be formed to include a first post-receiving aperture and a second post-receiving aperture. The first attachment post may extend through the first post-receiving aperture and the second attachment post may extend through the second post-receiving aperture.

In some embodiments, the first blade track segment may include a support hanger that extends from the arcuate runner into a channel formed by the first seal support. The support hanger may include a radially-extending portion that extends from the arcuate runner and a circumferentially-extending portion that extends from the radially-extending portion into the channel formed by the first seal support.

In some embodiments, the first shroud segment may include a first radial seal element arranged radially between the first carrier segment and the first blade track segment to block gasses from passing through a radial interface of the first carrier segment and the first blade track segment. The first radial seal element may be a rope seal.

In some embodiments, the first carrier segment may include a mount plate and a seal-support wall that extends radially from the mount plate toward the first blade track segment. The seal-support wall may be formed to include a rope-receiving channel facing the first blade track segment that receives the rope seal.

In some embodiments, first shroud segment may include a second radial seal element arranged radially between the first carrier segment and the first blade track segment to block gasses from passing through the radial interface of the first carrier segment and the first blade track segment. The first blade track segment may include an arcuate runner and an attachment post that extends from the arcuate runner to the first carrier segment. The attachment post of the first ceramic blade track may be located axially between the first radial seal element and the second radial seal element.

According to another aspect of the present disclosure, a shroud segment for use in a segmented turbine shroud that extends around a central axis is taught. The shroud segment may include a carrier segment, a blade track segment coupled to the carrier segment, a forward radial seal element, and an aft radial seal element. The forward radial seal element may be arranged radially between the carrier segment and the blade track segment along a forward side of the blade track segment to block gasses from passing through a forward radial interface of the carrier segment and the first blade track segment. The an aft radial seal element may be arranged radially between the carrier segment and the blade track segment along an aft side of the blade track segment, spaced from the forward side along the central axis, to block gasses from passing through a forward radial interface of the carrier segment and the first blade track segment.

In some embodiments, the first blade track segment may include an arcuate runner and an attachment post that extends from the arcuate runner to the first carrier segment. The attachment post of the first ceramic blade track may be located axially between the forward radial seal element and the aft radial seal element. In some embodiments, the forward radial seal element and the aft radial seal element may each selected from a group including a rope seal, a strip seal, a feather sea, and a canted coil seal.

In some embodiments, the first carrier segment may include a mount plate, a forward seal-support wall, and an aft seal-support wall. The forward seal-support wall may extend radially from the mount plate toward the first blade track segment along a forward side of the mount plate and may be formed to include a seal-element locating feature that engages the forward seal element. The aft seal-support wall that wall may extend radially from the mount plate toward the first blade track segment along an aft side of the mount plate and may be formed to include a seal-element locating feature that engages the aft seal element.

According to another aspect of the present disclosure, a turbine shroud may include a carrier and a blade track segment. The blade track segment may be made from a ceramic-matrix-composite material. The blade track segment may include an arcuate runner and a support hanger. The support hanger may have a radially-extending portion and a circumferentially-extending portion.

In some embodiments, the turbine shroud may also include an axial hanger. The axial hanger may be formed to include a circumferentially-opening channel that receives a portion of the carrier and the circumferentially-extending portion of the support hanger to couple the blade track segment to the carrier.

In some embodiments, the carrier may be formed to include a post-receiving aperture. In such embodiments, the blade track segment may include an attachment post that extends radially outward from the runner through the post-receiving aperture.

According to another aspect of the present disclosure, a method of assembling a segmented turbine shroud that extends around a central axis is taught. The method may include coupling a first blade track segment to a first carrier segment to form a first shroud segment and coupling a second blade track segment to a second carrier segment to form a second shroud segment.

In some embodiments, the method may include forming a circumferential seal between the first shroud segment and the second shroud segment. Circumferential seal formation may include inserting portions of the first carrier segment and the first blade track segment into a channel formed in a first seal support, inserting portions of the second carrier segment and the second blade track segment into a channel formed in a second seal support, and inserting a strip seal that extends from the first seal support into a seal-receiving slot formed in the second seal support.

In some embodiments, coupling a first blade track segment to a first carrier segment may include arranging a radial seal element between the first blade track segment and the first carrier segment, inserting an attachment post included in the first blade track segment through a post-receiving aperture formed in the first carrier segment, and attaching a retainer to the attachment post to block movement of the attachment post out of the post-receiving aperture.

These and other features of the present disclosure will become more apparent from the following description of the illustrative embodiments.

BRIEF DESCRIPTION OF THE DRAWINGS

FIG. 3 is a cross-sectional view of the turbine shroud included in the gas turbine engine of FIGS. 1 and 2 showing that the turbine shroud is made up a number of shroud segments arranged around a phantom turbine rotor;

FIG. 4 is a detail view of a portion of the turbine shroud shown in FIG. 3;

DETAILED DESCRIPTION OF THE DRAWINGS

Figure 1:
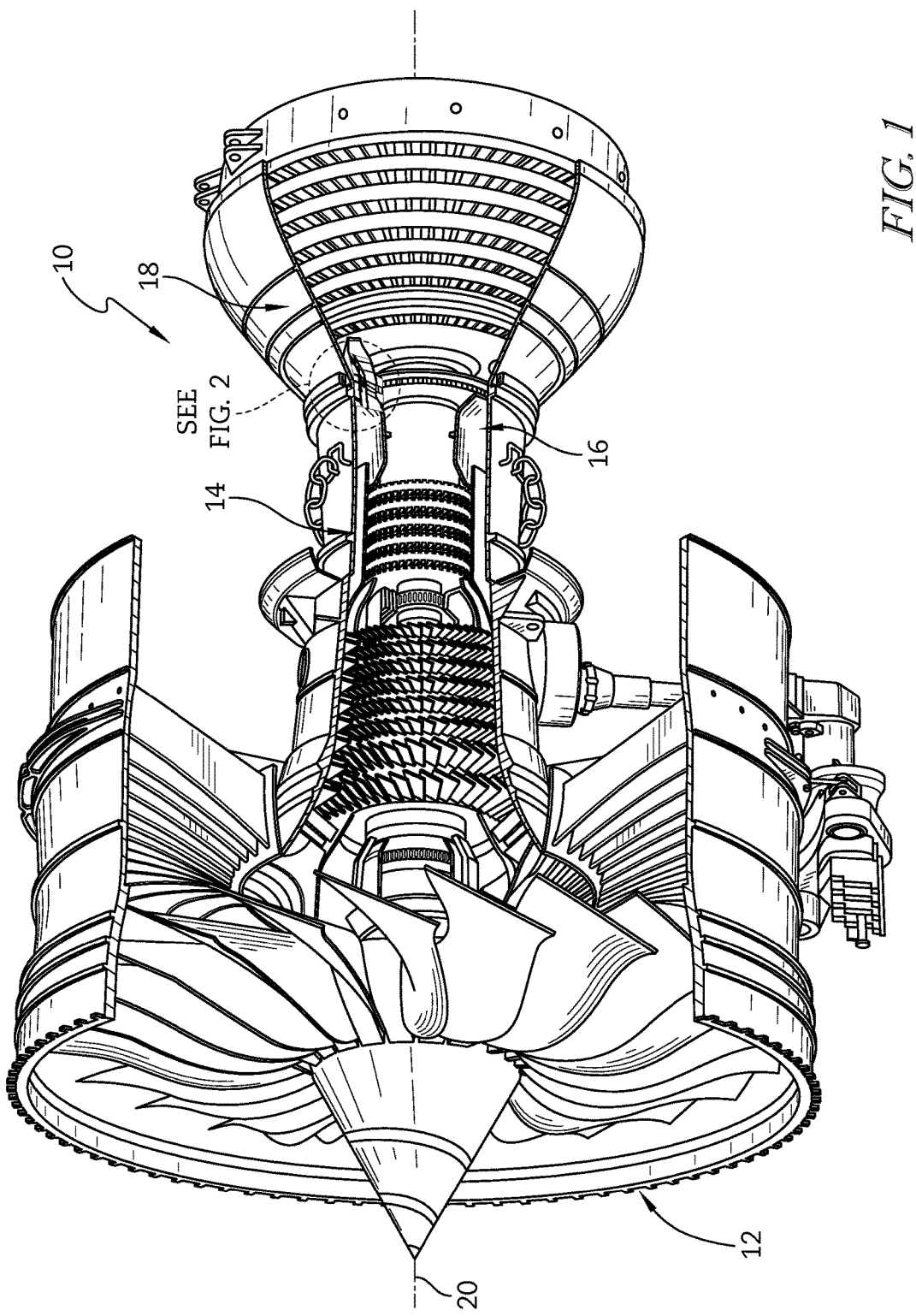
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

An illustrative aerospace gas turbine engine 10 cut-away in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 is compresses and delivers air to the combustor 16. The combustor 16 mixes fuel with the compressed air received from the compressor 14 and ignites the fuel. The hot high pressure products of the combustion reaction in the combustor 16 are directed into the turbine 18 to cause the turbine 18 to rotate about an axis 20 and drive the compressor 14 and the fan 12.

Figure 2:
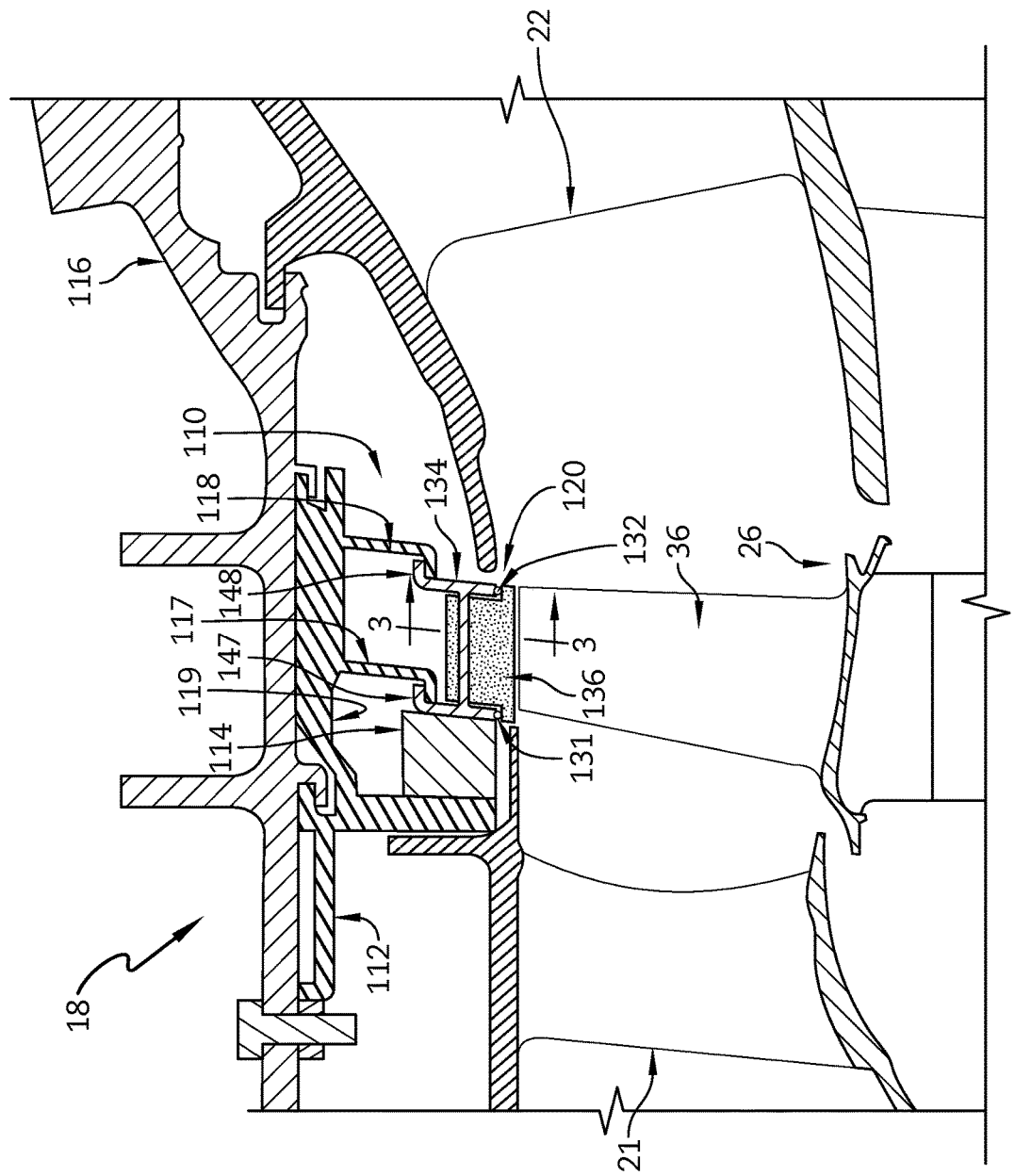
FIG. 2 is a partial cross-sectional view of the gas turbine engine of FIG. 1 showing the arrangement of a turbine shroud in the gas turbine engine.

Referring now to FIG. 2, a portion of the turbine 18 is shown to include static turbine vane assemblies 21, 22 and a turbine wheel assembly 26. The vane assemblies 21, 22 extend across the flow path of the hot, high-pressure combustion products from the combustor 16 to direct the combustion products toward blades 36 of the turbine wheel assembly 26. The blades 36 are in turn pushed by the combustion products to cause the turbine wheel assembly 26 to rotate; thereby, driving the rotating components of the compressor 14 and the fan 12.

The turbine 18 also includes a turbine shroud 110 that extends around turbine wheel assembly 26 to block combustion products from passing over the blades 36 without pushing the blades 36 to rotate as shown in FIGS. 2 and 3. Combustion products that are allowed to pass over the blades 36 do not push the blades 36 and such passed-over products contribute to lost performance within the engine 10.

The turbine shroud 110 illustratively includes a mount ring 112, a retainer ring 114, and a plurality of shroud segments 120 as shown in FIG. 2. The mount ring 112 is coupled to a turbine case 116 and includes a pair of L-shaped hanger brackets 117, 118 that extend inwardly in a radial direction from a mount body 119 to support the plurality of shroud segments 120. The retainer ring 114 engages the mount ring 112 and the plurality of shroud segments 120 to hold the shroud segments 120 in place relative to the mount ring 112. The shroud segments 120 are supported relative to the turbine case 116 by the mount ring 112 and retainer ring 114 in position adjacent to the blades 36 of the turbine wheel assembly 26. In other embodiments, the shroud segments 120 may be coupled directly to the turbine case 116 or may be supported relative to the turbine case 116 by another suitable arrangement.

Figure 5:
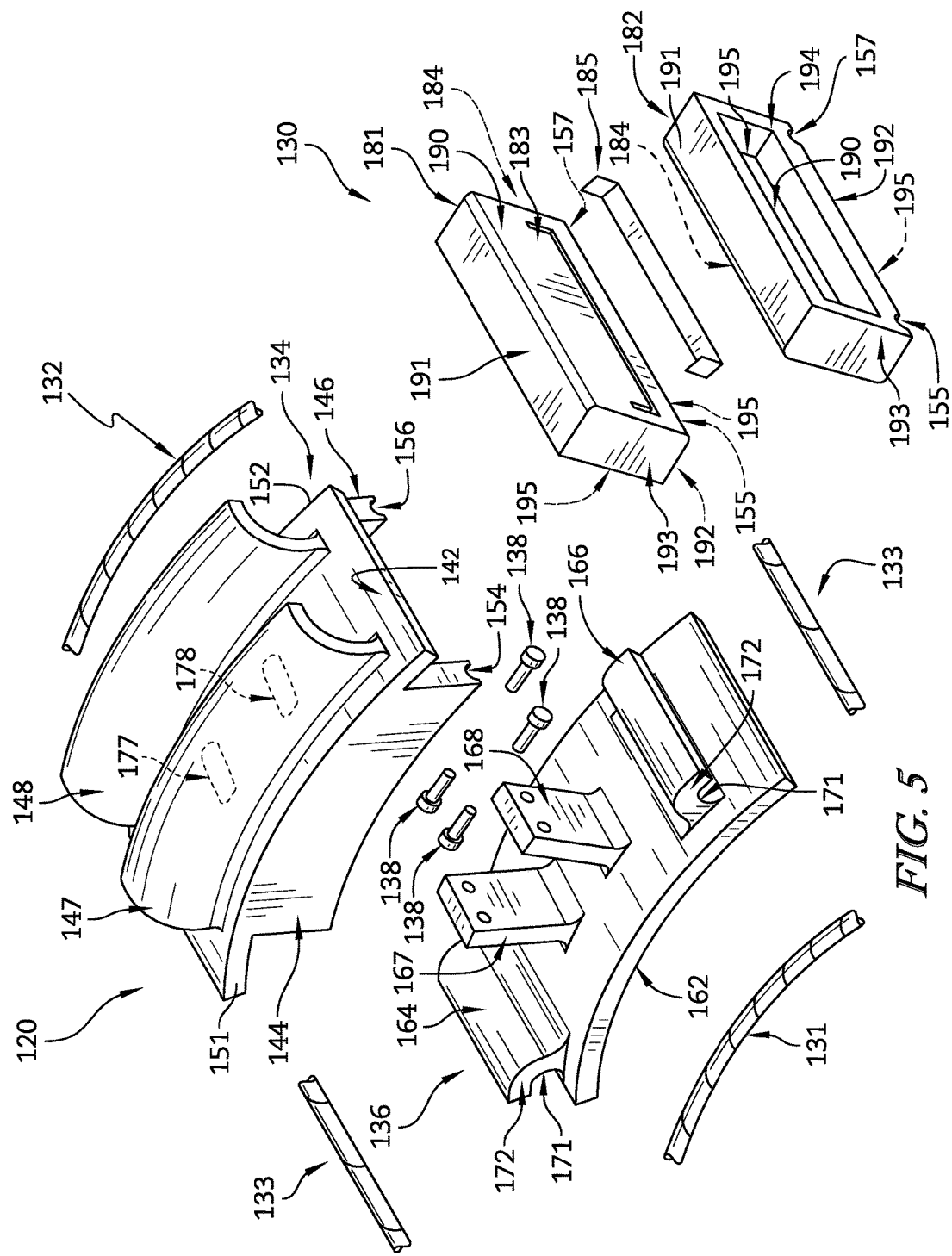
FIG. 5 is an exploded perspective view of a shroud segment included in the turbine shroud shown in FIGS. 3 and 4 showing that each turbine shroud segment includes a carrier segment, a blade track segment, and a pair of rope seals for sealing between the carrier segment and the blade track segment and showing that the turbine shroud includes circumferential strip seals for circumferential sealing between shroud segments.

The plurality of shroud segments 120 are illustratively assemblies that are arranged circumferentially adjacent to one another to form a ring around the turbine wheel assembly 26 as shown, for example, in FIG. 3. Circumferential seals 130 are arranged circumferentially between the shroud segments 120 to block gasses from passing through a circumferential interface 122 between shroud segments 120. Forward and aft radial seal elements 131, 132 are arranged radially between components of the shroud segments 120 around the circumference of the turbine shroud 110 to block gasses from passing through radial interfaces 124, 126 of components included in the shroud segments 120 as shown in FIG. 5. Finally, axial seals 133 are arranged radially between components of the shroud segments 120 and extend in the axial direction to block gasses from passing through axial interfaces 125 of components included in the shroud segments 120 as shown in FIGS. 3 and 4.

The circumferential seals 130 illustratively include a first seal support 181, a second seal support 182, and a seal element 185 that extends from the first seal support 181 to the second seal support 182 as shown in FIG. 5. The first seal support 181 and the second seal support 182 are illustratively made from a metallic material into which corresponding seal-element locating features 183, 184 are formed. The seal element 185 is illustratively a strip seal that extends into seal-element locating features 183, 184 that are illustratively thin slots. By forming the seal-element locating features 183, 184 into the metallic seal supports 181, 182, components of the shroud segments 120 (e.g. a ceramic blade track 136) need not be machined to include thin slots or other locating features. Additionally, in the illustrative embodiment, the seal supports 181, 182 provide means for coupling components of the shroud segments together as shown, for example, in FIG. 4.

Each shroud segment 120 includes a carrier segment 134, a ceramic blade track segment 136, and a plurality of retention pins 138 as shown, for example, in FIGS. 3-5. The carrier segments 134 cooperate to provide an annular carrier 135 and are coupled to the mount ring 112 to secure the shroud segments 120 to the turbine case 116 as suggested in FIGS. 2 and 3. The blade track segments 136 extend around the turbine wheel assembly 26 and block hot gasses from passing over the blades 36. The retention pins 138 couple the blade track segments 136 to corresponding carrier segments 134. In other embodiments, nuts, retention clips, or other retainers may be used in place of the retention pins 138 to couple the blade track segments 136 to the carrier segments 134.

In the illustrative embodiment, each carrier segment 134 includes a mount plate 142, a forward seal-support wall 144, an aft seal-support wall 146, and a pair of L-shaped hanger arms 147, 148 as shown in FIG. 5. Each carrier segment 134 is illustratively made from a metallic material but in other embodiments may be made from a ceramic material, a composite material such as a ceramic-matrix-composite material (CMC), or another suitable material. The mount plates 142 are illustratively arcuate and support the blade track segments 136. The forward seal-support wall 144 locates a forward radial seal element 131 between corresponding carrier segments 134 and blade track segments 136 as shown in FIGS. 2 and 5. The hanger arms 147, 148 cooperate with the hanger brackets 117, 118 of the mount ring 112 to couple the shroud segments 120 to the mount ring 112 as shown in FIG. 2.

The forward seal-support wall 144 is illustratively formed to include a circumferentially-extending seal-element locating channel 154 that receives the forward radial seal element 131 as shown in FIGS. 2 and 5. The forward seal-support wall 144 extends radially inward from the mount plate 142 toward a corresponding blade track segment 136 along a portion of a forward side 151 of the mount plate 142.

The aft seal-support wall 146 is illustratively formed to include a seal-element locating channel 156 that receives the aft radial seal element 132 as shown in FIGS. 2 and 5. The aft seal-support wall 146 extends radially inward from the mount Plate 142 toward a corresponding blade track segment 136 along a portion of an aft side 152 of the mount plate 142.

Further, in the illustrative embodiment, each seal support 180, 181 is formed to include circumferentially-extending seal-element locating channels 155, 157 that receive the forward and the aft radial seal elements 131, 132 as shown in FIG. 5. Thus, in the illustrative embodiment, the seal elements 131, 132 are received in channels 154, 155, 156, 157 that extend around the circumference of the turbine shroud 110 along each shroud segment 120.

The illustrative the radial seal elements 131, 132 are rope seals held in place by forward and aft seal-support walls 144, 146 included in a carrier segment 134 as shown in FIG. 5. The seal elements 131, 132 engage blade track segments 136 to block gasses from passing through forward and aft radial interfaces 124, 126 of the carrier segment 134 and the ceramic blade track segment 136. The forward and aft seal elements 131, 132 also space the carrier segment 134 from the blade track segment 136 so that the carrier segment 134 is insulated from the high temperatures that are sometimes achieved by the blade track segment 136. In other embodiments, the seal elements 131, 132 may be strip seals, feather seals, canted coil seals, and/or other suitable types of seal.

The illustrative axial seal elements 133 are rope seals held in place by the seal supports 181, 182 as shown in FIGS. 3 and 4. Each seal support 181, 182 is formed to include an inwardly facing seal-element locating channels 195 extending in the axial direction that receives a portion of an axial seal element 133. The seal elements 133 engage blade track segments 136 to block gasses from passing through axial interfaces 125 of the carrier segment 134 and the ceramic blade track segment 136. The seal elements 133 also space the carrier segment 134 from the blade track segment 136 so that the carrier segment 134 is insulated from the high temperatures that are sometimes achieved by the blade track segment 136. In other embodiments, the seal elements 133 may be strip seals, feather seals, canted coil seals, and/or other suitable types of seal.

The blade track segment 136 of each shroud segment assembly 120 is illustratively a monolithic ceramic component made from ceramic-matrix-composite materials (CMGs) that are adapted to withstand high temperature environments. In other embodiments, the blade track segment 136 of each shroud segment assembly 120 may be made from other materials. Each blade track segment 136 illustratively includes an arcuate runner 162, a first support hanger 164, a second support hanger 166, and a pair of attachment posts 167, 168 as shown in FIGS. 4 and 5. The runner 162 extends around the blades 36 of the turbine wheel assembly 26 and blocks gasses from passing over the blades 36. The support hangers 164, 166 extend from the runner 162 and are coupled to the circumferential seals 130 of the turbine shroud 110. The pair of attachment posts 167, 168 also extend from the runner 162 and couple the blade track segments 136 to corresponding carrier segments 134.

In the illustrative embodiment, each support hanger 164, 166 of the blade track segments 136 includes a radially-extending portion 171 that extends outward from the arcuate runner 162 and a circumferentially-extending portion 172 that extends circumferentially from the radially-extending portion 171 as shown in FIGS. 4 and 5. The circumferentially-extending portions 172 of each support hanger 164, 166 extend into a channel 186, 187 formed by the first or second seal supports 181, 182.

The first and the second attachment posts 167, 168 of each blade track segment 136 extend radially outward from the arcuate runner 162 as shown in FIG. 5. The second attachment post 168 is circumferentially spaced apart from the first attachment post 167 and extends parallel to the first attachment post 167. The first and the second attachment posts 167, 168 extend through corresponding first and second post-receiving apertures 177, 178 formed in the mount plate 142 of a carrier segment 134 and are retained in place by the retention pins 138 that are inserted into the first and the second attachment posts 167, 168 radially outward of the mount plate 142.

The circumferential seals 130 are arranged circumferentially between each circumferentially adjacent pair of shroud segments 120 to block gasses from passing through the circumferential interfaces 122 between the shroud segments 120 as suggested in FIGS. 3 and 4. As noted above, the circumferential seals 130 include the first seal support 181, the second seal support 182, and the seal element 185 as shown in FIG. 5. Each seal support 181, 182 is illustratively made from a metallic material but in other embodiments may be made from a ceramic material, a composite material such as a ceramic-matrix-composite material (CMC), or another suitable material.

The first seal support 181 is coupled to a first shroud segment 120 and the second seal support 182 is coupled to a second shroud segment 120 arranged circumferentially adjacent to the first shroud segment 120 as shown, for example, in FIG. 4. The seal element 185 extends from the first seal support 181 to the second seal support 182 to close any circumferential gap between the two seal supports 181, 182. In some embodiments, the seal element 185 may be integrated with the first seal support 181 by machining the parts together, bonding the parts together, or otherwise fixing them together so that the seal element 185 and first seal support 181 are a unitary component.

The first and the second seal supports 181, 182 each illustratively include an end plate 190 and side walls 191, 192, 193, 194 that extend from the end plate 190 to form a circumferentially-opening channel 195 within an open-box-shape as shown in FIG. 5. In some embodiments, axial side walls 193, 194 may be omitted while maintaining the formation of channels 195 within a C-shape.

In addition to supporting the seal element 185, the seal supports 181, 182 provide axial hangers, sometimes called bird-mouth hangers, that couple circumferential ends of the blade track segment 136 to the carrier segment 134 as shown in FIG. 4. The channel 195 of each of the first and the second seal supports 181, 182 receive a portion of a carrier segment 134 and a portion of a blade track segment 136 as shown in FIG. 4. More specifically, the radially-extending portion 171 of each support hanger 164, 166 included in a blade track segment 136 is received in the channel 195 of a seal support 181, 182. Also, in the particular embodiment shown, an end portion 175, 176 of the mount plate 142 included in a carrier segment 134 is received in the channel 195 of a seal support 181, 182. This coupling may ease assembly of shroud segments 120, may provide additional loading points of loading for the blade track segments 130, and may improve the ability of the blade track segments 136 to function at high operating pressures.

The segmented turbine shroud 110 may be assembled by a method including assembling a plurality of shroud segments 120 and locating a plurality of circumferential seals 130 between pairs of circumferentially adjacent shroud segments 120. Each shroud segment 120 may be assembled by coupling a ceramic blade track segment 136 to a carrier segment 134. In some embodiments, assembly of a ceramic blade track segment 136 may include arranging a radial seal element between the blade track segment 136 and the carrier segment 134, inserting the pair of attachment posts 167, 168 included in the blade track segments 136 through post-receiving apertures 177, 178 formed in the carrier segments 134, and attaching the retention pins 138 to the attachment posts 167, 168 to block movement of the attachment posts 167, 168 out of the post-receiving apertures 177, 178.

The circumferential seal 130 may be formed by inserting portions of a first carrier segment 134 and a first blade track segment 136 into the channel 195 formed in the first seal support 181 and inserting portions of a second carrier segment 134 and a second blade track segment 136 into the channel 195 formed in the second seal support 182. The circumferential seal 130 may then be completed by inserting the seal element 185 (illustratively a strip seal) that extends from the first seal support into the seal-element locating features 183, 184 (illustratively seal-receiving slots) formed in the seal supports 181, 182.

Upon assembly, a cavity 199 is formed by each shroud segment 120 between the mount plate 142 of the carrier segment 134 and the runner 162 of the blade track segment 136 as shown in FIG. 4. The cavities 199 are independent from one another and are sealed from airflow from most adjacent cavities. Cooling air may be supplied to the cavities 199 to cool the runner 162 of each blade track segment 136.

Figures 6, 7:
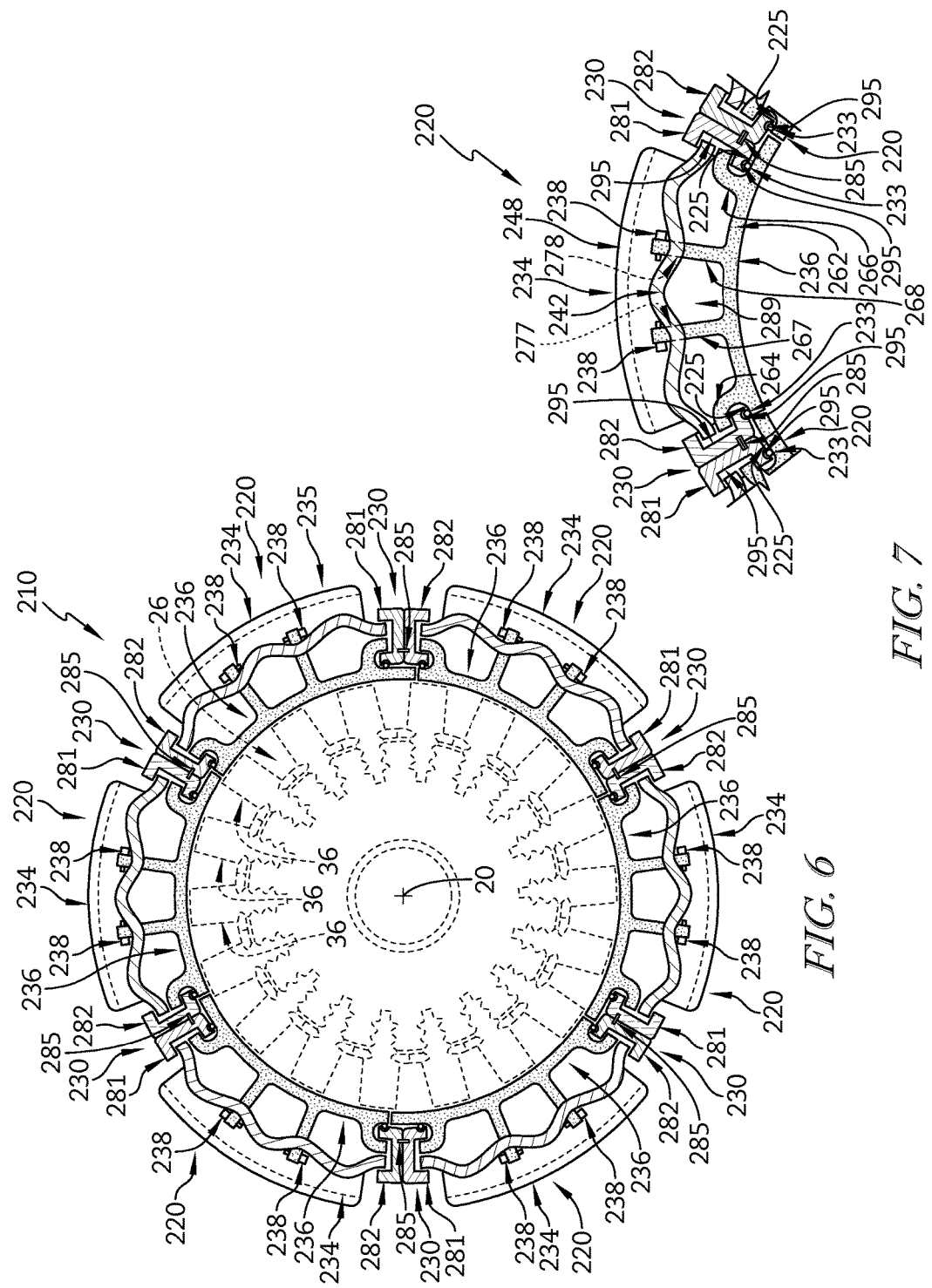
FIG. 6 is a cross-sectional view of an alternative turbine shroud adapted for use in a gas turbine engine showing that the turbine shroud is made up a number of shroud segments arranged around a phantom turbine rotor.
FIG. 7 is a detail view of a portion of the alternative turbine shroud shown in FIG. 6.

Another illustrative turbine shroud 210 is shown in FIGS. 6 and 7. The turbine shroud 210 is configured for use in engine 10 and is substantially similar to the turbine shroud 110 shown in FIGS. 2-5 and described herein. Accordingly, similar reference numbers in the 200 series indicate features that are common between the Turbine shroud 110 and the turbine shroud 210. Further the method of assembling the turbine shroud 210 is similar to the method of assembling the turbine shroud 110 described herein. The description of the engine 10 and the turbine shroud 110 and its method of assembly are hereby incorporated by reference to apply to the turbine shroud 210, except in instances when it conflicts with the specific description and drawings of the turbine shroud 210.

Unlike the turbine shroud 110, the mount plate 242 included in the carrier segments 236 of each blade track segment 220 form a sinusoidal-type wave pattern along a portion of an arc as shown in FIGS. 6 and 7. The shape of the mount plates 242 allows for adjustment to the stiffness of the carrier segments 236 and of the turbine shroud 220.

In the illustrative embodiment of FIGS. 6 and 7, the post receiving apertures 277, 278 through which the attachment posts 267, 268 extend are formed to extend through radially-inwardly located valleys of the mount plate 242 between radially-outwardly located peaks of the mount plate 242. By locating the post-receiving apertures 277, 278 through the valleys, the required length of the attachment posts 267, 268 may be reduced.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A segmented turbine shroud that extends around a central axis, the segmented turbine shroud comprising
    a first shroud segment including a first carrier segment and a first blade track segment, the first blade track segment made from a ceramic-matrix-composite material and coupled to the first carrier segment,
    a second shroud segment arranged circumferentially adjacent to the first shroud segment around the central axis, the second shroud segment including a second carrier segment and a second blade track segment, the second blade track segment made from a ceramic-matrix-composite material and coupled to the first carrier segment, and
    a circumferential seal arranged between the first shroud segment and the second shroud segment to block gasses from passing through a circumferential interface of the first shroud segment and the second shroud segment, the circumferential seal including a first seal support coupled to the first shroud segment, a second seal support coupled to the second shroud segment, and a seal element that extends from the first seal support to the second seal support,
    wherein the first blade track segment includes an arcuate runner and a first attachment post that extends from the arcuate runner to the first carrier segment.

2. The segmented turbine shroud of claim 1, wherein the seal element is a strip seal that extends into a seal-receiving slot formed in the second seal support.

3. The segmented turbine shroud of claim 1, wherein the first seal support forms a channel that receives a portion of the first carrier segment and a portion of the first blade track segment.

4. The segmented turbine shroud of claim 3, wherein the second seal support forms a channel that receives a portion of the second carrier segment and a portion of the second blade track segment.

5. The segmented turbine shroud of claim 3, wherein the first blade track segment includes a support hanger that extends from the arcuate runner into the channel formed by the first seal support.

6. The segmented turbine shroud of claim 5, wherein the support hanger includes a radially-extending portion that extends from the arcuate runner and a circumferentially-extending portion that extends from the radially-extending portion into the channel formed by the first seal support.

7. The segmented turbine shroud of claim 1, wherein the first blade track segment includes a second attachment post circumferentially spaced apart from the first attachment post, the second attachment post extends parallel to the first attachment post from the arcuate runner to the first carrier segment, the first carrier segment is formed to include a first post-receiving aperture and a second post-receiving aperture, the first attachment post extends through the first post-receiving aperture, and the second attachment post extends through the second post-receiving aperture.

8. The segmented turbine shroud of claim 1, wherein the first blade track segment includes a support hanger that extends from the arcuate runner into a channel formed by the first seal support.

9. The segmented turbine shroud of claim 8, wherein the support hanger includes a radially-extending portion that extends from the arcuate runner and a circumferentially-extending portion that extends from the radially-extending portion into the channel formed by the first seal support.

10. The segmented turbine shroud of claim 1, wherein the first shroud segment includes a first radial seal element arranged radially between the first carrier segment and the first blade track segment to block gasses from passing through a radial interface of the first carrier segment and the first blade track segment.

11. The segmented turbine shroud of claim 10, wherein the first radial seal element is a rope seal.

12. The segmented turbine shroud of claim 11, wherein the first carrier segment includes a mount plate and a seal-support wall that extends radially from the mount plate toward the first blade track segment, the seal-support wall formed to include a rope-receiving channel facing the first blade track segment that receives the rope seal.

13. A segmented turbine shroud that extends around a central axis, the segmented turbine shroud comprising
    a first shroud segment including a first carrier segment and a first blade track segment, the first blade track segment made from a ceramic-matrix-composite material and coupled to the first carrier segment,
    a second shroud segment arranged circumferentially adjacent to the first shroud segment around the central axis, the second shroud segment including a second carrier segment and a second blade track segment, the second blade track segment made from a ceramic-matrix-composite material and coupled to the first carrier segment, and
    a circumferential seal arranged between the first shroud segment and the second shroud segment to block gasses from passing through a circumferential interface of the first shroud segment and the second shroud segment, the circumferential seal including a first seal support coupled to the first shroud segment, a second seal support coupled to the second shroud segment, and a seal element that extends from the first seal support to the second seal support,
    wherein the first shroud segment includes a first radial seal element arranged radially between the first carrier segment and the first blade track segment to block gasses from passing through a radial interface of the first carrier segment and the first blade track segment, and the first shroud segment includes a second radial seal element arranged radially between the first carrier segment and the first blade track segment to block gasses from passing through the radial interface of the first carrier segment and the first blade track segment, the first blade track segment includes an arcuate runner and an attachment post that extends from the arcuate runner to the first carrier segment, and the attachment post of the first ceramic blade track is located axially between the first radial seal element and the second radial seal element.

14. A shroud segment for use in a segmented turbine shroud that extends around a central axis, the shroud segment comprising
a carrier segment,
a blade track segment coupled to the carrier segment,
a forward radial seal element arranged radially between the carrier segment and the blade track segment along a forward side of the blade track segment to block gasses from passing through a forward radial interface of the carrier segment and the blade track segment, and
an aft radial seal element arranged radially between the carrier segment and the blade track segment along an aft side of the blade track segment, spaced from the forward side along the central axis, to block gasses from passing through an aft radial interface of the carrier segment and the blade track segment,
wherein the blade track segment includes an arcuate runner and an attachment post that extends from the arcuate runner to the carrier segment, and the attachment post of the blade track is located axially between the forward radial seal element and the aft radial seal element.

15. The shroud segment of claim 14, wherein the forward radial seal element and the aft radial seal element are each selected from a group including a rope seal, a strip seal, a feather sea, and a canted coil seal.

16. The shroud segment of claim 15, wherein the carrier segment includes a mount plate, a forward seal-support wall that extends radially from the mount plate toward the blade track segment along a forward side of the mount plate formed to include a seal-element locating feature that engages the forward seal element, and an aft seal-support wall that extends radially from the mount plate toward the blade track segment along an aft side of the mount plate formed to include a seal-element locating feature that engages the aft seal element.

17. A turbine shroud comprising
a carrier,
a blade track segment made from a ceramic-matrix-composite material including an arcuate runner and a support hanger, the support hanger having a radially-extending portion and a circumferentially-extending portion, and
an axial hanger formed to include a circumferentially-opening channel that receives a portion of the carrier and the circumferentially-extending portion of the support hanger to couple the blade track segment to the carrier,
wherein the carrier is formed to include a post-receiving aperture and the blade track segment includes an attachment post that extends radially outward from the runner through the post-receiving aperture.

* * * * *